United States Patent Office 3,168,553
Patented Feb. 2, 1965

3,168,553
REACTIONS OF OLEFINS WITH CARBON
MONOXIDE
Lynn H. Slaugh, Pleasant Hill, Calif., assignor to Shell
Oil Company, New York, N.Y., a corporation of
Delaware
No Drawing. Filed Aug. 25, 1961, Ser. No. 133,810
6 Claims. (Cl. 260—497)

The present invention relates to the catalytic conversion of olefins to various organic derivatives thereof. More particularly, it relates to the reaction of olefins with carbon monoxide and a selected reactant in the presence of certain complex metal catalysts.

It has already been proposed to hydroformylate olefins whereby alcohols and aldehydes are produced therefrom. Such hydroformylation processes contemplate in many instances the use of certain metal complex catalysts.

It is a principal object of the present invention to produce various organic compounds other than aldehydes or alcohols by a catalytic process analogous to hydroformylation of olefins. Another important object of the invention is to provide novel processes for converting olefins to other important industrial chemicals by means of contacting the reactants with catalytically active materials specially designed and fabricated for such purposes. Other objects and features of advantage will be apparent from a consideration of the following specification and claims appended hereto.

Briefly stated, the invention broadly contemplates reacting olefins, preferably having from two to twenty carbon atoms, and especially olefin hydrocarbons, with carbon monoxide and a reactant having an active hydrogen and an acid dissociation constant no greater than $10^{-3}$ in the presence of a transition metal complex catalytically active material under conditions suitable to form a carbonyl compound.

In accordance with the invention, an olefinic feed, a suitable active hydrogen-containing compound, and carbon monoxide are reacted in a reaction zone maintained under conditions suitably adapted to promote the desired product formation in the presence of a transition metal complex catalyst.

The catalyst employed in the present invention comprises a complex between a Group VIIIb transition metal selected from the group consisting of cobalt, ruthenium, rhodium, and iridium, and a biphyllic ligand containing a trivalent atom of a Group Va element selected from the group consisting of phosphorus, arsenic, and bismuth, wherein the trivalent atom has one available pair of electrons.

As used throughout the specification and claims, the term "complex" indicates a coordination compound which is a combination of a metal atom with one or more electronically rich molecules or atoms capable of independent existence.

As has already been mentioned, the transition metal must be either cobalt, ruthenium, rhodium, or iridium, and regardless of the particular metal employed, when the complex serving as catalyst is in its active form, the transition metal will be in a reduced valence state. This will normally be a zero valence state and may suitably be even lower, such as a −1 valence state.

The transition metal selected is held in complex combination with several biphyllic ligands. The number of biphyllic ligand compounds in the complex is equal to the coordination number of the particular transition metal involved. By "biphyllic ligand" is meant a compound having an element with a pair of electrons capable of forming a coordinate bond with a metal atom and simultaneously having the ability to accept the electrons from the metal, thereby providing additional stability to the resulting complex. The carbon monoxide molecule is an excellent example of a biphyllic ligand and may serve as such in the complexes suitable as catalysts of this invention. However, the catalysts of this invention must also contain at least one biphyllic ligand having an arsenic or bismuth or phosphorus atom, wherein said atom is trivalent. Of these three, biphyllic ligands involving phosphorus are preferred and will therefore be used to illustrate the types of structures that are suitable as biphyllic ligands. It will be understood that analogous structures in which the phosphorus atom is replaced by arsenic or bismuth are also suitable.

The preferred biphyllic ligands containing trivalent phosphorus are those in which the phosphorus atom has one available or unshared pair of electrons. Any compound containing trivalent phosphorus with the foregoing electronic configuration is a suitable biphyllic ligand for the catalysts of the present invention. When trivalent phosphorus has such an electronic configuration, it is capable of forming a coordinate bond with the transition metals previously described, and simultaneously has the ability to accept electrons from those metals. It thus will operate as a biphyllic ligand in forming the desired complexes for use as catalysts in the present process.

The three valences of the phosphorus atom may accordingly be satisfied by any organic radical since it is only the presence of the phosphorus atom having an available pair of electrons that is crucial to the formation of the complex with the transition metal. Consequently organic radicals of any size and composition may be bonded to the phosphorus atom. Contemplated within the scope of this invention therefore are trivalent phosphorus compounds having aliphatic, and/or cycloaliphatic, and/or heterocyclic, and/or aromatic radicals satisfying its three valences. These radicals may contain any functional group such as the carbonyl, carboxyl, nitro, amino, hydroxy functional groups, as well as saturated and unsaturated non-carbon-to-carbon linkages, and the radical may be bonded to the phosphorus atom (or analogous arsenic or bismuth atom) directly by a carbon-to-phosphorus (C-P) linkage or through an electronegative atom such as oxygen, sulfur and nitrogen.

It is also suitable for a single organic radical to satisfy more than one of the valences of the phosphorus atom, thereby forming a heterocyclic compound with a trivalent phosphorus atom. For example, an alkylene radical may satisfy two phosphorus valences with its two open valences and thereby form a cyclic compound. Another example would be the alkylene dioxy radical to form a cyclic compound where oxygen atoms link an alkylene radical to the phosphorus atom. In these two examples, the third phosphorus valence may be satisfied by any other organic radical, although preferably of the same functional type.

Another type of structure involving trivalent phosphorus having an available pair of electrons are those containing a plurality of such phosphorus atoms linked by organic radicals. This type of a compound is called a bidentate ligand when two such phosphorus atoms are present, a tridentate ligand when three such phosphorus atoms are present, and so forth. Examples of these polydentate ligands include such structures as

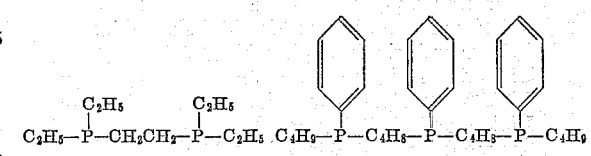

and the like.

Of particular interest among the catalysts employed in the present invention are those which comprise the complex represented by the general monomeric formula $$[(R_z'A)_x—L—R_y]_p M(CO)_n$$

wherein M is a Group VIIIb transition metal selected from the group consisting of cobalt, ruthenium, rhodium, and iridium, L is an atom of a Group Va element selected from the group consisting of phosphorus, arsenic and bismuth, R and R′ are individually selected from the group consisting of alkyl, aryl, aralkyl, and alkaryl radicals, A is selected from the group consisting of oxygen, nitrogen and sulfur atoms, $x$ and $y$ are integers whose sum is equal to 3, $p$ and $n$ are integers whose sum is equal to the coordination number of the transition metal provided that $p$ is equal to at least 1, and $z$ is an integer from 1 to 2 equal to the valence of A minus 1.

The preferred phosphorus compounds of particular interest as ligands for the present catalysts in accordance with the foregoing formula include oxygen-containing esters, thioesters, and amides of trivalent phosphorus, such as phosphites, thiophosphites, and amidophosphites, as well as phosphorus compounds having combinations of oxygen-containing esters, thioester groups, and amido groups. The organic portion of each ester of amide portion of the molecule preferably is a hydrocarbon radical of from one to twenty carbon atoms. Most preferably it is an alkyl radical such as ethyl; an aryl radical such as phenyl or naphthyl; an alkaryl radical such as tolyl; or an aralkyl radical such as phenylethyl.

Instead of esters, thioesters, or amides of trivalent phosphorus, suitable biphyllic ligands involving phosphorus include those wherein substituents, such as the afore-described aryl hydrocarbon radicals, are directly bonded to the phosphorus atom by a C-P linkage. With three such linkages including P-H linkages, the compound is a phosphine. While all of the different types of groups noted above may be substituted on the phosphorus atom, such as aryl radicals like the phenyl radical, alkyl radicals have been found to be most suitable. Therefore, trialkyl phosphines are a preferred group of biphyllic ligands forming a part of the complex catalysts of this invention.

When the ligand contains arsenic or bismuth in place of phosphorus, terminolgy consistent with the phosphorus terminology will be used as follows:

| Phosphorus Compounds | Arsenic Compounds | Bismuth Compounds |
|---|---|---|
| Phosphite = | Arsenite = | Bismuthite |
| Phosphonite = | Arsonite = | Bismuthonite |
| Phosphinite = | Arsinite = | Bismuthinite |
| Phosphine = | Arsine = | Bismuthine |

The complex catalysts formed between the transition metal and the biphyllic ligand may be monomeric in structure, or the active structure of the complex may be composed of several monomeric units. The dicobalt octacarbonyl molecule is an example of a dimer. Correspondingly, the complex formed between cobalt and a trialkyl phosphite, such as triethyl phosphite, may also be a dimer. Specific examples of the complexes suitable for use as catalysts in the process of this invention include the following:

Complex between—
Cobalt and triphenyl thiophosphite
Rhodium and triethyl phosphite
Cobalt and triphenylphosphine
Rhodium and triethyl arsenite
Rhodium and triethyl bismuthite
Cobalt and dibutylamidodiethyl phosphinite
Cobalt and dipropylamidodimethyl arsite
Rhodium and tris(dimethylamido)bismuthine
Iridium and tri-n-butylphosphine
Iridium and triethyl phosphite
Iridium and tripropyl arsenite
Iridium and triethylarsine
Ruthenium and triphenylbismuthine
Ruthenium and triethyl phosphite
Ruthenium and O,O-dimethylphenyl phosphonite In any of the above specific examples of complexes, a carbon monoxide molecule can be used to replace any of the listed biphyllic ligands involving phosphorus, arsenic, and bismuth, provided that at least one ligand molecule involving one of the latter three atoms is present in each complex. For example, in the complex between rhodium and tripropylphosphine, instead of having the complex involve only tripropylphosphine molecules, an equally suitable complex would be one having rhodium, carbon monoxide, and at least one tripropylphosphine molecule.

The catalysts for use in the process of this invention may be prepared by a diversity of methods. A convenient method is to combine a salt of an organic acid of the desired transition metal with the selected biphyllic ligand in liquid phase. The valence state of the transition metal may then be reduced by hydrogenating the solution prior to the use of the catalysts therein. It may also be accomplished simultaneously with the formylation process of this invention by means of increased carbon monoxide pressure but without the presence of hydrogen. Alternatively, the catalysts may be prepared from a carbon monoxide complex of the desired transition metal. For example, it is possible to start with dicobalt octacarbonyl, and by heating this substance with a suitable biphyllic ligand of the type previously described, the ligand will replace one or more of the carbon monoxide molecules, producing the desired catalyst. This latter method was utilized in the preparation of most of the catalysts used in the examples hereinafter described. This latter method is very convenient for regulating the number of carbon monoxide molecules and other types of ligand molecules present in the catalyst. Thus, by increasing the amount of ligand added to the dicobalt octacarbonyl, more of the carbon monoxide molecules are replaced, until all of the carbon monoxide molecules have been replaced by the added ligand.

In accordance with the invention the olefin and carbon monoxide are reacted in the presence of the catalytic material already described with certain other selected reactants, such selection depending in a large measure upon the particular reaction product sought. For example, the selected reactant may be an alcohol, such as an unsubstituted aliphatic alcohol, in which case an ester will generally be formed. For example, by reacting ethylene with carbon monoxide and ethyl alcohol in the presence of a catalytic material described herein, there is formed ethyl propionate, although in this particular instance diethyl ketone may also be formed and, under certain conditions, in rather large proportions. Instead of an alcohol, the reactant may be water, in which instance an organic acid is formed. Ammonia, primary and secondary alkyl amine, such as dialkyl amine or diaryl amine, will form a corresponding amide. A mercaptan forms a thioester; and an organic acid, such as an aliphatic mono-carboxylic acid, forms an acid anhydride, occasionally a mixed acid anhydride if desired. Therefore it will be quite apparent from a consideration of the herein description of the invention that the scope of the process varies over a wide range of valuable products, many of which have considerable industrial importance. Representative specific reactants are: methanol, isopropyl alcohol, tertiary butyl alcohol, 2-ethyl hexanol, cetyl alcohol, stearyl alcohol, abietyl alcohol, ethylene glycol, glycerine, pentaerythritol, phenol, naphthol, citric acid, tartaric acid, n-butyric acid, isobutyric acid, pivalic acid, benzoic acid, salicylic acid, ethanolamine, diethanolamine, morpholine, pyrrolidine, furfuryl alcohol, hexamethylene diamine, ethylene diamine, acetamide, β-methoxyethanol, β-ethoxy propionic acid, and cyclohexanol. As has been pointed out, various esters, organic acids, amides, thioesters, and/or organic acid anhydrides may be produced through the catalytic processes of the invention.

It will be appreciated that the reaction may be conducted in the presence of inert diluent, as for example, a saturated hydrocarbon, with the principal qualification being that the diluent which may under certain circumstances constitute the reaction medium be compatible and substantially non-reactive with the ingredients of the process. Hydrocarbons such as hexanes, heptanes, octanes, and the like, including homologues and mixtures thereof, will be found to function satisfactorily and other materials similar thereto will readily suggest themselves to those skilled in the art.

The reaction proceeds in part in a manner similar to conventional hydroformylation processes. The olefin molecule is coupled with the carbon monoxide reactant and the reactive hydrogen from the other selected reactant, such as, for example, a diaryl amine, attaches to the point of ethylene unsaturation; in general the remainder of the reactant molecule is attached elsewhere in the combined olefin-carbon monoxide intermediate, namely the C-atom of the added CO, whereby in the case illustrated a corresponding amide is formed. For instance, diphenyl amine plus carbon monoxide plus n-pentene will form under proper reaction conditions and in the presence of an appropriate catalyst such as, for example, a rhodium/carbonyl-tributylphosphine complex, an N,N-diphenyl caproamide. In some instances, such as when the other reactant is also a relatively easily dehydrogenatable substance, such as an alcohol which is dehydrogenatable to an aldehyde, an additional hydrogen is made available which converts a second olefin molecule to a corresponding radical which by its free valence is bonded to the carbonyl carbon, thereby providing a ketone. Other products and reactions will suggest themselves from a consideration of the examples and table set forth hereinafter.

The process of the present invention contemplates olefinic feed streams containing hydrocarbon materials having at least one ethylenic carbon-to-carbon bond. The feed may be aliphatic, including acyclic and alicyclic, as well as aryl derivatives thereof. Monoolefins such as ethylene, propylene, butylene, and even higher molecular weight materials are a few examples of suitable feeds. Both branched- and straight-chain compounds may be employed so long as they provide one more ethylenic or olefinic site. These sites may be conjugated as in 1,3-butadiene, or non-conjugated as in 1,5-hexadiene. Unsaturated olefinic linkages may be between terminal and their adjacent carbon atoms, as in 1-pentene, or between internal chain carbon atoms, as in 4-octene.

The invention also contemplates the potential use of hydrocarbon cyclic compounds as feeds, such materials including unsaturated alicyclic hydrocarbons as, for example, the cyclic olefins containing carbon-to-carbon unsaturation such as the cycloalkenes as, for example, cyclopentene, cyclohexene, cycloheptene, 1,5-cyclooctadiene, and 1,3-cyclooctadiene. Polycyclic olefins of various types such as polycyclic terpenes, fused-ring polycyclic olefins, and the like may also be employed to advantage depending largely, of course, on the particular reaction product desired. Illustrative substances are pinene, bicyclo(2,2,1)hepta-2,5-diene, dicyclopentadiene, and 1,4,4a,5,8,8a - hexahydro - 1,4,5,8 - dimethanonaphthalene.

The optimum conditions suitable for accomplishing the desired product formation depend on the type of olefinic feed supplied to the reaction zone as well as on the particular reaction product to be manufactured. The process is conducted by intimately contacting the olefin, generally in liquid phase, with carbon monoxide and the other selected reactant in the presence of a catalytically active material already described under conditions of temperature and pressure adapted to effect the reaction between the three reactants. The catalysts of the present invention have the advantage of good stability and activity even when employed at quite low pressures. These may be in the order of as low as 1 atmosphere or less. Preferably, however, pressures in the range of from about 800 to 3000 p.s.i. of carbon monoxide have been found advantageous with from 800 to 1200 p.s.i. being generally most preferable. Even higher pressures, of course, will be used if desired.

The temperature employed in the reaction zone will be of a degree which results in appreciable product formation at the pressure selected. The temperatures will then accordingly be in the range of from about 75 to 250° C. with from 150 to 200° C. being preferred. It has been found that a temperature of about 200° C. is advantageous in most instances.

The invention will be more fully understood with regard to various processing details as well as the particular catalysts found especially advantageous for use therein by reference to the following examples and the table appended hereto. It will of course be appreciated that these descriptions and data are furnished for purposes of explanation and exposition and are not to be considered as limitations on the scope and spirit of the invention except as delineated in the appended claims.

EXAMPLE 1

Into a stainless steel autoclave were placed 100 ml. of ethanol, 1.7 grams of dicobalt octacarbonyl and 8 grams of tri-n-butylphosphine. After sealing and flushing the autoclave with nitrogen, ethylene was introduced until the pressure reached 175 p.s.i.g. Carbon monoxide was then introduced until the pressure reached 1050 p.s.i.g. While agitating, the autoclave was heated to 180° C. for nine hours. Maximum pressure was 2200 p.s.i.g. Total pressure drop was 540 p.s.i.g. The yields of products formed are listed in the first column of the following table.

EXAMPLES 2–7

Reactions similar to those in Example 1 were conducted and the results therefrom are listed in the table, columns 2–7. It will be noted that the relative amounts of diethyl ketone and ethyl propionate depend upon the particular reaction conditions.

Infrared spectra and other analytical data indicated that the catalysts were cobalt/carbonyl-tri-n-butylphosphine complexes and not dicobalt octacarbonyl.

*Table*

| Example No. | 1 | 2 | 3 | 4 | 5 | 6 | 7 |
|---|---|---|---|---|---|---|---|
| Ethylene, millimoles | 264 | 264 | 250 | 257 | 118 | 153 | 207 |
| Ethanol, ml | 100 | 40 | 40 | 40 | 40 | 40 | 40 |
| $Co_2(CO)_8$, milligram-atoms Co. | 10 | 10 | 10 | 10 | 5 | 5 | 0 |
| n-Bu$_3$P, millimoles | 40 | 40 | 0 | 40 | 20 | 0 | 40 |
| Temperature, ° C | 180 | 180 | 175 | 175 | 175 | 175 | 177 |
| Maximum pressure, p.s.i.g. | 2190 | 1860 | 1650 | 1090 | 780 | 915 | 1815 |
| Length of experiment, hrs. | 9 | 7 | 7.5 | 14 | 13.5 | 14 | 18 |
| Product, millimoles: | | | | | | | |
| Acetaldehyde | 157 | 35 | 3.1 | 4.5 | 30 | 0 | 0 |
| Ethyl propionate | 58 | 42 | 12.6 | 14.7 | 5.5 | 1.2 | 0 |
| Diethyl ketone | 75.5 | 43 | 57 | 63.4 | 46.4 | 8.2 | 0 |
| Unidentified | 74 | ~10 | | | 10 | | |
| Conversion of olefin,[a] Percent. | ~100 | 48 | 51 | 55 | ~100 | 11.5 | 0 |
| Diethyl ketone/ethyl propionate, mole ratio | 1.30 | 1.02 | 4.52 | 4.31 | 8.45 | 6.8 | 0 |

[a] Based upon the ethylene accounted for in the products. No attempt was made to measure the unreacted ethylene.

EXAMPLE 8

Into an 80 ml., magnetically stirred, stainless steel autoclave were placed one gram of tri-n-butylarsine, 40 ml. of ethanol and 0.34 gram of dicobalt octacarbonyl. After sealing and flushing with nitrogen gas, an ethylene/carbon monoxide mixture (mole ratio of 2.0) was introduced until the pressure was approximately 800 p.s.i.g. While stirring, the autoclave was heated to 160° C. for three hours. The product contained 0.4 gram ethyl propionate and 1.8 grams of diethyl ketone.

EXAMPLE 9

Into an 80 ml., magnetically stirred, stainless steel autoclave were placed 40 ml. of ethanol, 0.67 gram of iridium chloride, 0.82 gram of tri-n-butylphosphine, and 0.8 gram of sodium acetate. A hydrogen/carbon monoxide mixture (730 p.s.i.g.; ratio 2/1) was introduced and the autoclave heated to 175° C. for 20 minutes to form the iridium/carbonyl-tri-n-butylphosphine complex which is the catalyst for the reaction. After venting the hydrogen and carbon monoxide, ethylene/carbon monoxide (2/1 mixture) was introduced and the autoclave heated to 195° C. for one hour. About 0.8 gram of ethyl propionate was formed.

EXAMPLE 10

The experiment described in Example 9 was repeated using 0.4 gram of ruthenium trichloride instead of iridium chloride. Reaction time was one hour at 195° C. 0.9 gram of ethyl propionate and a trace of diethyl ketone were recovered.

EXAMPLE 11

Into an 80 ml., magnetically stirred autoclave were placed 40 ml. of ethanol, 0.42 gram of rhodium chloride, 0.82 gram of tri-n-butylphosphine, and 1.0 gram of sodium acetate. After sealing and flushing with nitrogen, hydrogen and carbon monoxide (2/1 mixture) was introduced until the pressure was 600 p.s.i.g. The autoclave was then heated to 150° C. for 20 minutes to form the rhodium/carbonyl-tri-n-butylphosphine complex (catalytic material). After venting the hydrogen and carbon monoxide, 4.5 grams of 1-pentene was placed into the autoclave. The autoclave was pressured with carbon monoxide and heated to 195° C. for 3.5 hours. Maximum pressure was 1320 p.s.i.g. at 195° C. 3.6 grams of ethyl hexanoates were produced by the reaction.

EXAMPLE 12

The experiment described in Example 11 was repeated using iridium chloride instead of rhodium chloride. 2.0 grams of ethyl hexanoates were produced by the reaction.

EXAMPLE 13

Into an autoclave were placed 40 ml. of ethanol, 4.1 grams of tri-n-butylphosphine, and 0.85 gram of dicobalt octacarbonyl. After flushing the autoclave with nitrogen, 13 grams of propylene were introduced followed by carbon monoxide until the pressure reached 570 p.s.i.g. at room temperature. The autoclave was heated to 175° C. for 13 hours. One gram of ethyl butyrates was produced by the reaction.

EXAMPLE 14

Into an autoclave was placed 10 ml. of n-octane, 0.82 gram of tri-n-butylphosphine and 0.34 gram of dicobalt octacarbonyl. After flushing with nitrogen, hydrogen and carbon monoxide (2/1 mixture) were introduced until the pressure reached 500 p.s.i.g. The autoclave was then heated to 175° C. for 15 minutes to form the cobalt/carbon monoxide-tri-n-butylphosphine complex (catalytic material). After venting, 30 ml. of diethylamine was introduced. Ethylene and carbon monoxide (2/1 mixture) were then introduced until the pressure reached 350 p.s.i.g. and the autoclave heated to 195° C. for two hours. One gram of diethyl propionamide was produced by the reaction.

EXAMPLE 15

Into an autoclave equipped with a glass liner were placed 40 ml. of propionic acid, 0.85 gram of dicobalt octacarbonyl and 4.1 grams of tri-n-butylphosphine. After flushing with nitrogen, 2.0 grams of ethylene and 560 p.s.i.g. (25° C.) of carbon monoxide were introduced. The autoclave was heated for 15 hours at 175° C. 4.8 grams of propionic anhydride were produced by the reaction.

EXAMPLE 16

Into a nitrogen-flushed autoclave were placed 40 ml. of water, 4.1 grams of tri-n-butylphosphine, 0.85 gram of dicobalt octacarbonyl, and 6.8 grams of ethylene. After introducing carbon monoxide until the pressure was 630 p.s.i.g. at room temperature, the autoclave was heated for 5 hours at 170° C. Maximum pressure at 170° C. was 1330 p.s.i.g. One gram of propionic acid was produced by the reaction.

I claim as my invention:

1. In the process for the production of carbonyl compounds wherein a mono-olefinic hydrocarbon having from two to twenty carbon atoms to the molecule is reacted with carbon monoxide and an active hydrogen-containing compound having an acid dissociation constant no greater than $10^{-3}$ selected from the group consisting of unsbstituted aliphatic alcohols, primary and secondary alkyl amines, and unsubstituted aliphatic monocarboxylic acids, in the presence of a Group VIII$b$ transition metal carbonyl catalyst, the improvement consisting essentially of effecting said reaction in liquid phase, at a temperature of from about 75 to about 250° C., a pressure of from about 800 to about 3,000 p.s.i., and employing as said catalyst a complex catalyst consisting essentially of a member of the group consisting of cobalt, ruthenium, rhodium, and iridium in complex combination with carbon monoxide and a tri-alkylphosphine.

2. The process in accordance with claim 1 wherein said complex catalyst is a tri-n-butylphosphine-cobalt-carbonyl complex.

3. In the process for the production of carbonyl compounds wherein a mono-olefinic hydrocarbon having from two to twenty carbon atoms to the molecule is reacted with carbon monoxide and ethyl alcohol in the presence of a Group VIII$b$ transition metal carbonyl catalyst, the improvement consisting essentially of effecting said reaction in liquid phase, at a pressure of from about 800 to about 3,000 p.s.i., and a temperature of from about 150 to about 200° C., and employing as said catalyst a tri-n-butylphosphine-cobalt-carbonyl complex.

4. The process in accordance with claim 3 wherein said mono-olefinic hydrocarbon is ethylene.

5. The process in accordance with claim 3 wherein said mono-olefinic hydrocarbon is 1-pentene.

6. The process in accordance with claim 3 wherein said mono-olefinic hydrocarbon is propylene.

References Cited in the file of this patent

UNITED STATES PATENTS

| | | |
|---|---|---|
| 1,979,717 | Vail | Nov. 6, 1934 |
| 2,526,742 | Gresham et al. | Oct. 24, 1950 |
| 2,542,766 | Gresham | Feb. 20, 1951 |
| 2,593,440 | Hagemeyer | Apr. 22, 1952 |
| 2,689,261 | Reppe | Sept. 14, 1954 |
| 2,739,169 | Hagemeyer | Mar. 20, 1956 |